Dec. 9, 1947.  G. E. DUNN  2,432,395
CONSTANT VELOCITY JOINT
Filed July 8, 1943  5 Sheets—Sheet 1

INVENTOR
George E. Dunn.
BY Harness, Dickey & Pierce
ATTORNEYS.

INVENTOR.
George E. Dunn.
BY
Harness, Dickey & Pierce

Patented Dec. 9, 1947

2,432,395

UNITED STATES PATENT OFFICE.

2,432,395

CONSTANT VELOCITY JOINT

George E. Dunn, Dearborn, Mich., assignor to Universal Products Company Incorporated, Dearborn, Mich., a corporation of Delaware Application July 8, 1943, Serial No. 493,874

13 Claims. (Cl. 64—21)

1

The invention relates generally to universal joints and it has particular relation to a constant velocity type of universal joint.

One object of the invention is to provide an improved type of constant velocity universal joint wherein a cross is employed with balls on two of the trunnions operatng in raceways or guideways of a housing or body secured to one shaft.

Another object of the invention is to provide an improved type of constant velocity joint wherein the joint includes a housing or body having opposed cylindrical guideways receiving the ball elements on two opposed trunnions.

Another object of the invention is to provide a joint of the aforementioned character wherein improved means are employed for moving one trunnion axis into a shaft angle bisecting position and holding it in the bisecting plane during operation of the joint.

Another object of the invention is to provide an improved constant velocity joint, such as indicated, wherein parts to be lubricated are located away from the center of the joint so as to avoid lubrication problems caused by centrifugal force acting to throw the lubricant away from the center of the joint.

Another object of the invention is to provide an improved constant velocity universal joint which includes a spline action so as thereby to permit manufacture of shafts having combined constant velocity and spline action at minimum cost.

Another object of the invention is to provide a method and apparatus for economically and accurately forming parts of the joint so as to obtain certain operating relationships necessary to obtain constant velocity action.

Other objects of the invention will become apparent from the following specification, the drawings relating thereto, and the claims hereinafter set forth.

For a better understanding of the invention, reference may be had to the drawings, wherein.

Figure 1:
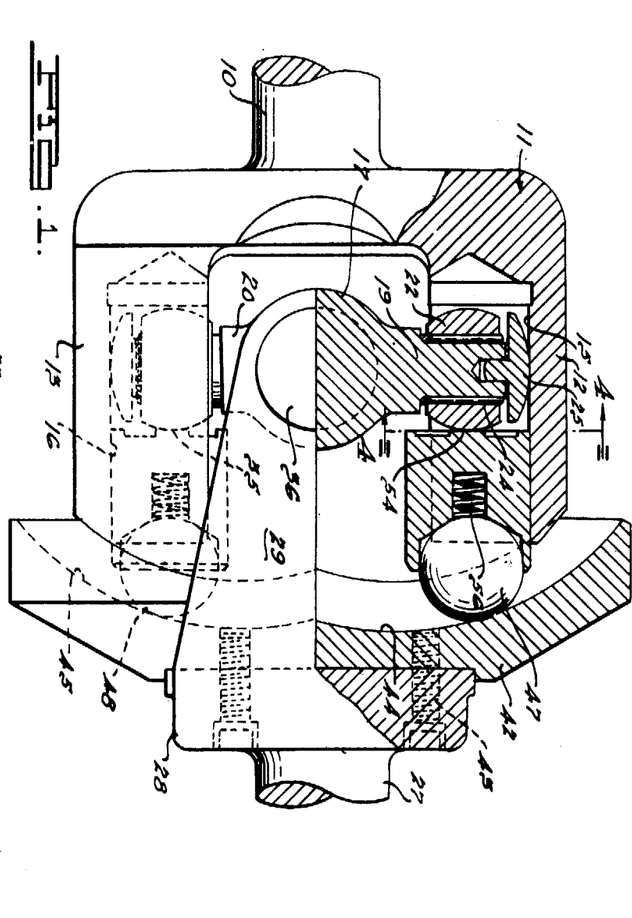
Figure 1 is a side-elevational view, partly in cross section, of a constant velocity type universal joint constructed according to one form of the invention.
Figure 2:
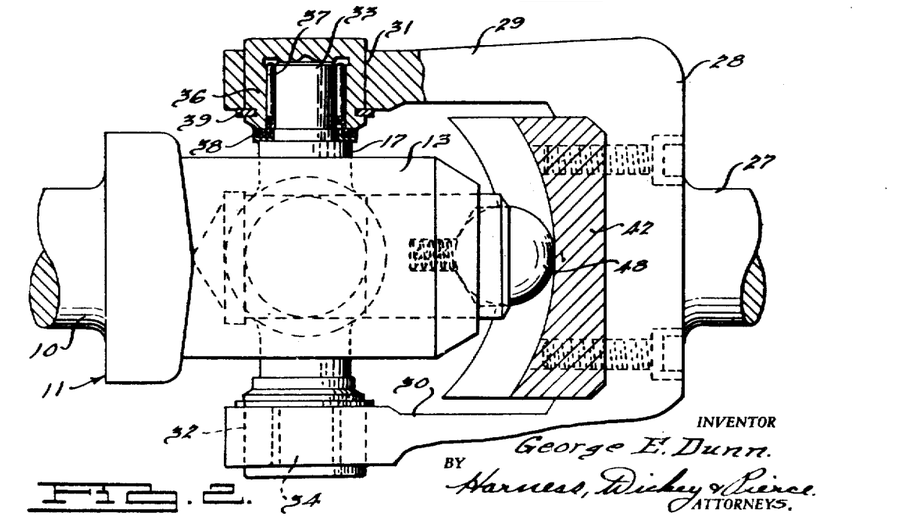
Figure 2 is a view on the order of Figure 1 showing the joint displaced 90° circumferentially.

Referring to Figures 1 and 2, the joint illustrated includes a shaft element 10 having a body 11 formed with diametrically opposed, axially extending arms 12 and 13. These arms are provided with axially extending cylindrical guideways 15 and 16, respectively, disposed in parallel relation and equi-distant from the shaft axis. A cross 17 has opposed trunnions 19 and 20 extending outwardly into the guideways 15 and 16, respectively, and each trunnion has a truncated ball 22 substantially fitting but movable in its guideway. Needle bearings 24 are provided between the opening in the ball and the surface of the trunnion for reducing friction, and a button 25 is provided on the trunnion for contact with the outer part of the guideway. The particular structure of the trunnion, ball, and button assembly may correspond substantially to that embodied in Warner Patent No. 1,921,274.

A second shaft 27 includes a yoke 28 having diametrically opposed arms 29 and 30 which respectively have diametrically aligned openings 31 and 32. These openings receive trunnions 33 and 34, respectively, formed on the cross 17 in right angle relation to the trunnions 19 and 20. A bearing cup 36 is provided in each of the openings 31 and 32 for receiving the trunnion therein and needle bearings 37 are provided between the wall of the cup and the trunnion. Suitable sealing means 38 are provided at the open end of the cups 36 for preventing escapement of lubricant from the needle bearing space and a split locking ring 39 may be employed for holding each cup in its opening, thereby centering the cross through engagement of the ends of the trunnions with the bottoms of the cup.

Figure 3:
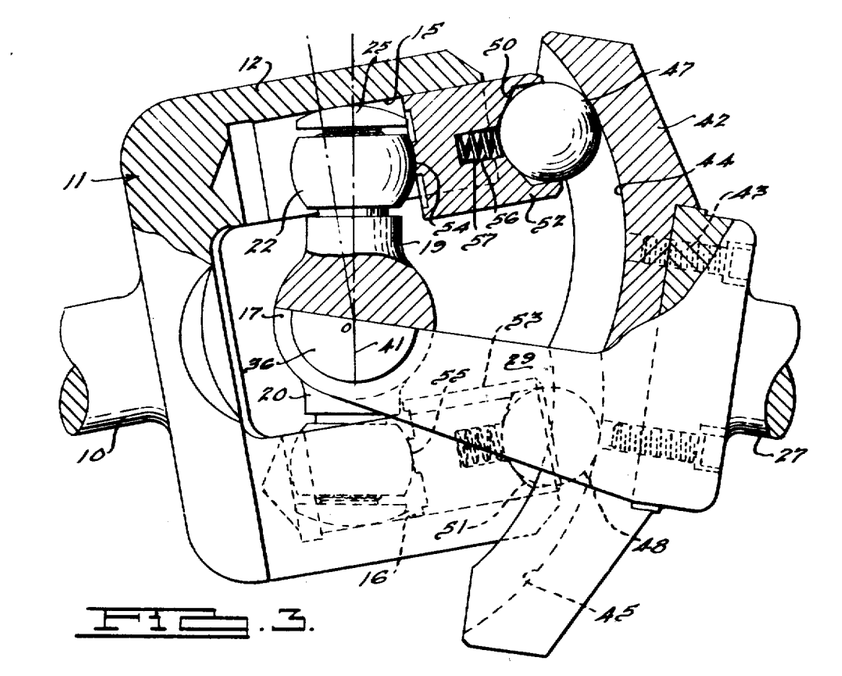
Figure 3 is a view on the order of Figure 1 showing the relation of parts when the two shafts are tilted relatively.
Figure 4:
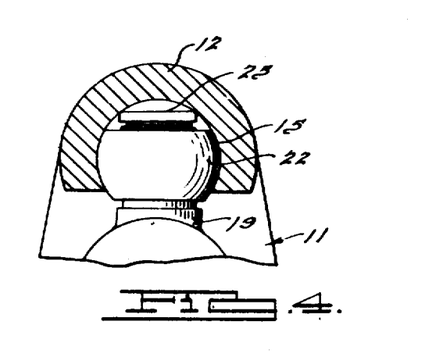
Figure 4 is a cross-sectional view taken substantially along the line 4—4 of Figure 1.

It will now be seen that if the shaft 10 is driven, rotary motion is imparted to the cross and through the latter to the shaft 27 and that during operation of the joint in this manner, the shaft may relatively shift axially, or, in other words, the guideways provide a spline connection permitting such movement. During any up-and-down swinging movement of the shaft 10, as seen in Figure 1, the buttons 25 hold the shaft centered and act as pivotal bearing surfaces for the guideways and any lateral swinging movement of the shaft occurs about the axes of balls 22. In order to obtain constant velocity action so that contant velocity of one shaft is transmitted to the other shaft, it is necessary to swing the trunnions 19 and 20 into a plane bisecting the shaft angle and to hold the axis of these trunnions in that plane during operation of the joint. Hence, if we shift the shafts 10 and 27 into angular relation, as seen in Figure 3, it is necessary that the trunnions 19 and 20 move into positions where their axis indicated at 41 bisects the angle between the axes of the shafts. While this is required of axis 41, the trunnions 33 and 34 are maintained in position at right angles to the axis of shaft 27 and it should be understood that it is only necessary to shift the one trunnion axis 41 into the bisecting plane in order to obtain the constant velocity action.

For effecting this shifting of the axis 41, or, in other words, the trunnions 19 and 20 into the bisecting position, a cam plate 42 is fastened to the shaft 27, as by means of bolts 43 and this plate has two cam surfaces 44 and 45 which are alike but oppositely disposed relative to the shaft axis. Such surfaces, respectively, contact balls 47 and 48 retained in pockets 50 and 51 formed in the ends of plunger elements 52 and 53. These plunger elements 52 and 53 have cylindrical outer surfaces closely but slidably fitting the guideways 15 and 16 and the ends of the plungers opposite the balls 47 and 48 have central projections 54 and 55 contacting the balls 22 respectively. It might be observed here that each projection has a flat end surface and that a substantially point contact is obtained between each ball 22 and the projection with the point on the axis of the guideway. Hence, even though the ball 22 turns relative to the projection, the distance between the center of the ball and the point contact will be constant. Also, the centers of the balls 47 and 48 are located on the axes of the guideways and it follows that the distance along such axes between the two ball centers, that is, between the centers of the one ball 22 and the ball 47 and between the opposite ball 22 and the ball 48 will be constant and the same. While close but working fits are obtained, a coil spring 56 may be provided in an opening 57 in each plunger and these springs act against the balls 47 and 48 to take up any tolerances. It will be appreciated that the assembly of cross, cam plate 42, yoke 29, plungers 52 and 53 and balls 47 and 48 are held together independently of the shaft 10 excepting for the fact that the plungers 52 and 53 must be guided in the guideways by their slidable engagement with the latter.

The cam surfaces 44 and 45 are of such shape and contour that they always maintain contact with balls 47 and 48 and as the shafts are tilted relatively, as seen in Figure 3, the cam surface 45 at the lower side forces the ball 48 and plunger 53 inwardly so as to shift the trunnion axis 41 into a bisecting position while the cam surface 44 at the upper side allows the proper outward movement of the ball 47 to enable positioning the axis in the bisecting plane. When the shafts are relatively tilted upwardly, the upper cam surface forces the upper ball inwardly while the lower ball 48 is allowed to move outwardly. During this movement inwardly or outwardly of the plungers, the cross swings about the axis of trunnions 33 and 34 which has a fixed location in the arms 29 and 30 of yoke 28. The character of the surfaces 44, 45 and the manner in which such surfaces may be obtained will now be described.

Figure 5:
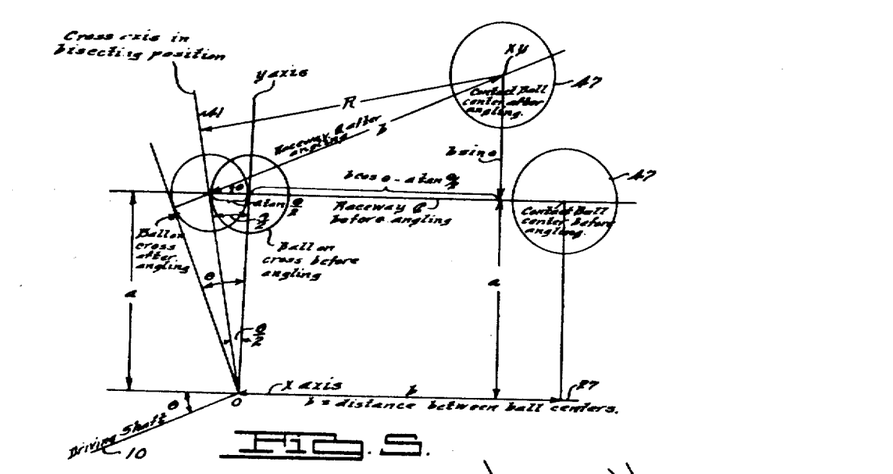
Figures 5, 6, 7, 8, 9, and 10 are geometircal diagrams illustrating mathematically the manner in which the constant velocity action is obtained.

Referring to Figure 5, the axes of the shafts 10 and 27 are indicated by the lines 10 and 27 with the shaft 10 shifted through an angle $\theta$ in the XY plane or plane of the paper. The drawing shows the two balls 22 and 47 at the upper side of the joint in two positions, first, with the two shaft axes aligned on the X axis, and secondly, with the shaft 10 shifted through the angle $\theta$. Initially, and before shaft 10 is shifted through the angle $\theta$, the center of ball 22 is on the Y axis the distance $a$ from the joint center or X axis, $a$ being the initial distance between the raceway and the X axis, while the center of the contact ball 47 is at the distance $a$ from the X axis and a distance $b$ from the Y axis. This distance $b$ is the distance between the two centers of the balls and is constant regardless of positions of the balls. It will be recalled that with any shift of shaft through $<\theta$, the trunnion axis 41 must shift through $<\theta/2$ and therefore geometrical relations must be present to obtain this result.

When the trunnion axis shifts through the angle $\theta/2$, the ball 22 moves to the second position shown, but the center of the ball is still on the axis of the raceway which moves through the angle $\theta$. The distance the center of the ball 22 moves along the X axis when the trunnion axis shifts through the angle $\theta/2$ therefore must equal $a \tan \theta/2$. As stated before, the raceway shifts through the angle $\theta$ and the new center of ball 47 still must be located the distance $b$ from the new center of ball 22. Hence, the XY position of the center of ball 47 may now be readily determined from the figures and it will be seen that the distance from the X axis is $a$ plus $b \sin \theta$ while the X distance is $b \cos \theta - a \tan \theta/2$. Hence, from Figure 5, for any shifting of the shaft 10 in the XY plane through any angle $\theta$, the position of the center of the contact ball 47 can be determined by the following equations:

$$X = b \cos \theta - a \tan \theta/2$$

$$Y = a + b \sin \theta$$

Figures 6, 7:
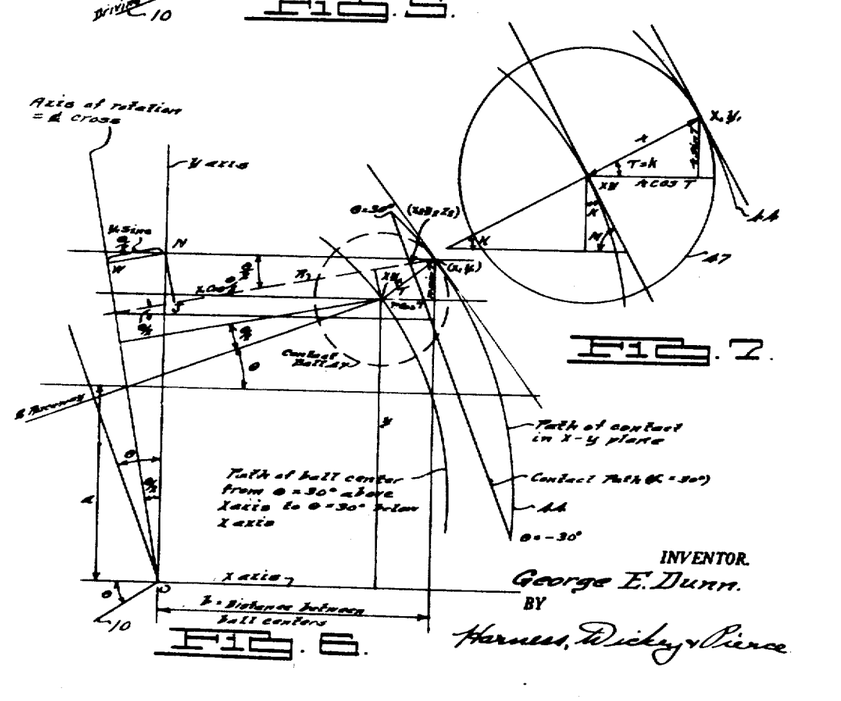

Now referring to Figure 6, which substantially corresponds to the Figure 5, the location of $X_1Y_1$, corresponding to the point of contact between the surface of the contact ball 47 and the cam surface 44 in the XY plane, may be determined. It might be mentioned at this time that movement of the shaft 10 in the XY plane through an angle $\theta$ below the X axis and through the same angle $\theta$ above the X axis corresponds to the same movement in the XY plane that would occur during any complete revolution of the shaft 10. Also, movement of the contact ball 47 along the contact surface 44 in the XY plane will be the same when the shaft 10 is shifted through the angle $\theta$ below and the angle $\theta$ above the X axis as if the shaft 10 were turned through one complete revolution. In other words, if we shift the shaft 10 in the XY plane from its $\theta$ position shown to a second $\theta$ position above the X axis, the line of contact between the contact ball and the cam surface 44 will be the same in the XY plane as during a complete revolution of the shaft 10. Therefore, in order to obtain all contacts in the XY plane, it is only necessary to move the shaft 10 in the plane of the paper through the desired angular range.

With the XY position of the center of the ball 47 obtained according to the equations previously mentioned, the slope of the curve or path of movement of the ball center may be determined as follows, referring particularly to Figure 7 in conjunction with Figure 6.

$$X = b \cos \theta - a \tan \theta/2$$

$$Y = a + b \sin \theta$$

$$\frac{dx}{d\theta} = -b \sin \theta - a/2 \sec^2 \theta/2$$

$$\frac{dy}{d\theta} = b \cos \theta$$

$$\frac{dx}{dy} = -\frac{b \sin \theta}{b \cos \theta} - \frac{a \sec^2 \theta/2}{2 b \cos \theta}$$

From this it can be shown that $$-\frac{dx}{dy} = \tan \theta + \frac{a}{b(\cos\theta + \cos^3\theta)}$$

As will be realized, the value:

$$-\frac{dy}{dx}$$

defines the slope of the curve or path of movement of the ball center and hence this slope may be determined for any XY point by the substitution of the values for $\theta$. Now, the path of movement of the contact point between the contact ball 47 and the surface 44 may be the same, and for any value $\theta$, the slope of the ball center curve at the XY point will be the same as the slope of the curve of the ball cam surface contact point or the $X_1Y_1$ point. With such slopes identical, they are parallel for any $\theta$ value as seen in Figure 7, and this slope is the tan $\tau$.

Viewing Figure 7, the tangent of $$<m = -\frac{dy}{dx}$$

$$\tan k = \tan \tau = -\frac{dx}{dy}$$

and $$\tan \tau = \tan \theta + \frac{a}{b(\cos\theta + \cos^3\theta)}$$

With $\tau$ thus determinable and equaling the angle between the radial normal distance between the ball center and the cam surface contact and a line parallel to the X axis, it becomes apparent that the Y distance between XY and $X_1Y_1$ is $r \sin \tau$. Likewise, it becomes apparent that the X distance between XY and $X_1Y_1$ is $r \cos \tau$. The location of $X_1Y_1$ then may be determined by the following equations:

$$X_1 = X + r \cos \tau$$

$$Y_1 = Y + r \sin \tau$$

Thus, the point of contact between the ball 47 and the cam surface may be located in the XY plane for any value $\theta$ through which the shaft 10 is moved in the XY plane.

All of the foregoing has made it possible to locate the $X_1Y_1$ points in the XY plane. In order to move into Z planes and locate the contact or $X_2Y_2Z_2$ points away from the XY plane so that the entire cam surface may be determined, movement of the shaft 10 not only in the XY plane but in the Z planes must be considered. It might be said in this connection that if we swing the shaft 10 about the center of the joint and in a conical movement so that the shaft generates a cone having its apex at the joint center and at the same time hold the other shaft member 27 stationary, the relative movements of the contact balls and cam surfaces will be the same as they would be if both shafts turned through one complete revolution with the shafts at an angle corresponding to half the cone angle. Hence, to determine the $X_2Y_2Z_2$ equations, it is only necessary to consider the movements that occur when the shaft axis 10 is moved in a cone generating path with the X axis as the axis of the cone.

Figures 8, 9, 10, 11:
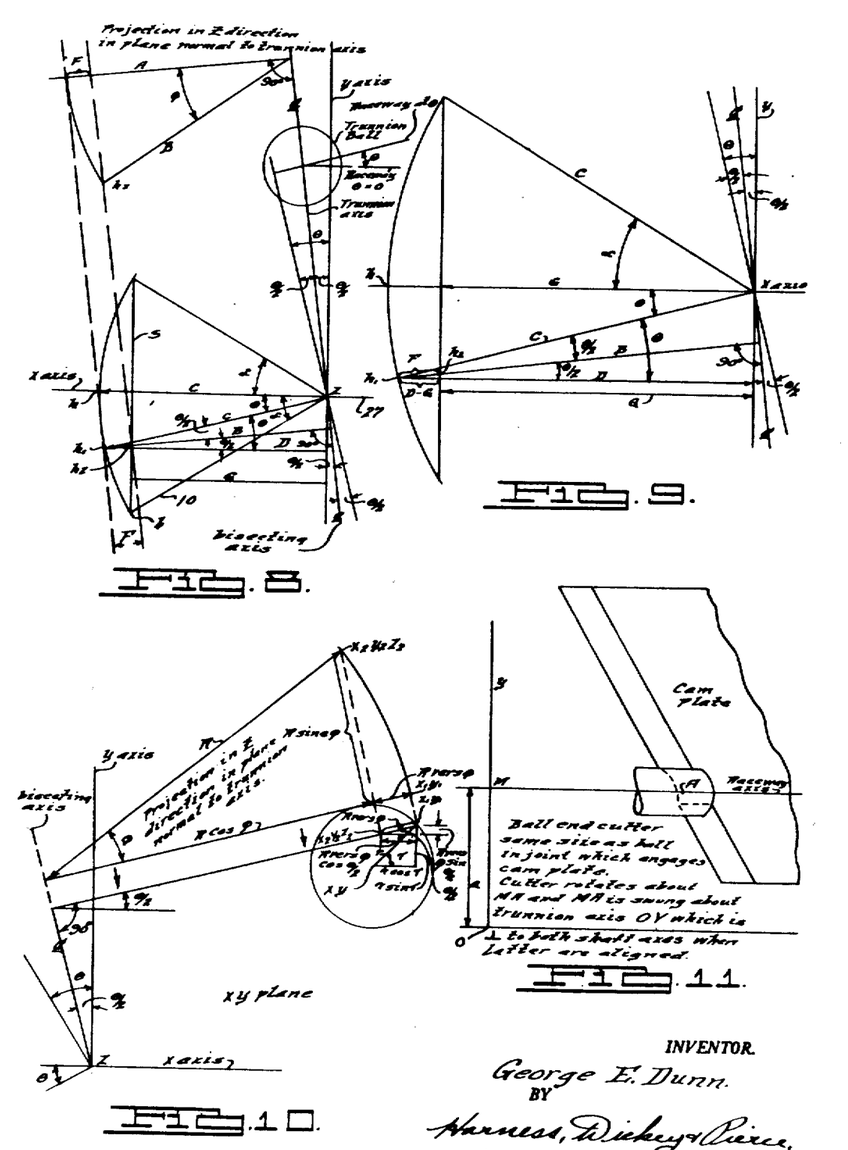
Figures 11, 12, 13, and 14 are geometrical diagrams illustrating the manner in which the cam surfaces may be cut on the cam plates in a practical manner.

Now, considering Figure 8, it may be assumed that the angle $\alpha$ is the running angle between the shafts 10 and 27, and, as stated above, movement of the shaft 10 in the path of a cone surface with the generating angle of the cone $=$ to $\alpha$ while holding the shaft 27 stationary will cause movement of the joint parts relatively in the same manner as if the shaft 10 turned through one revolution about its own axis and the shaft 27 correspondingly turned through one revolution about its axis. The point $h$ on the shaft 10 during this conical travel of the shaft axis will travel in a circular path $s$ about the X axis and when the point $h$ is on the $s$ circle, the contact balls will have contact with the cam surfaces at definite points and the points of contact will travel in annular paths on the cam plates as the point $h$ travels around the circle $s$. For each value of $\alpha$, a different path $s$ will exist and hence a different annular contact path on each cam surface will exist. By changing $\alpha$ by some small increments, the annular contact lines on the cam plates become so close together as to define surfaces, or, in other words, each cam surface comprises a series of annular line contacts increasing in diameter as the angle $\alpha$ increases from zero to a predetermined and practical value for universal joint operation.

It has already been shown that if we move the shaft 10 through the angle $\theta$ shown in Figure 8, corresponding XY and $X_1Y_1$ values may be determined and reference may be had to Figures 5, 6, and 7 in this respect. Now, in Figure 8, if we move the point $h$ through the angle $\theta$ until it reaches the point $h_1$ and then swing it about the bisecting axis until it reaches the circle $s$ at the point $h_2$, we have reached this point by moving through an angle $\theta$ in the XY plane and an angle $\phi$ in a plane perpendicular to the bisecting axis. At the upper end of Figure 8, a projection of the lines in a plane normal to the bisecting axis may be seen showing movement through the angle $\phi$. With reference now to both Figure 8 and Figure 9, which is an enlarged view of the lower part of Figure 8, the value of $\phi$ may be determined in values of $\theta$ and $\alpha$ as follows:

$$D = C \cos \theta$$

$$G = C \cos \alpha$$

$$\frac{F}{D-G} = \sec \theta/2$$

$$F = (D-G) \sec \theta/2$$

$$\cos \phi = \frac{A}{B} = \frac{B-F}{B}$$

$$B = C \cos \theta/2$$

$$F = (D-G) \sec \theta/2 = (C \cos \theta - C \cos \alpha) \sec \theta/2$$

Therefore, $$\cos \phi = \frac{C \cos \theta/2 - (C \cos \theta - C \cos \alpha) \sec \theta/2}{C \cos \theta/2}$$

It can be shown from this by further simplification that—

$$\cos \phi = \frac{1 - \cos \theta + 2 \cos \alpha}{1 + \cos \theta}$$

or that—

$$\cos \phi = \frac{\text{vers } \theta + 2 \cos \alpha}{1 + \cos \theta}$$

It might be reiterated that the foregoing has given us a method of obtaining $\phi$ in terms of $\theta$ and $\alpha$ with $\theta$ as the angle the shaft is moved in the XY plane, $\alpha$ is half the cone angle governing the annular path, and $\phi$ is the angle the shaft axis must move in a plane perpendicular to the trunnion axis in order for it to reach the $\alpha$ path.

Now referring to Figures 10 and 11, the movement of the shaft axis 10 in Figures 8 and 9 involves first, a movement of the contact point to the $X_1Y_1$ position as the shaft moves through angle $\theta$ in the XY plane and then when the shaft axis is swung through the angle $\phi$, the $X_1Y_1$ point swings through the same angle in a plane perpendicular to the bisecting axis until it reaches the point $X_2Y_2Z_2$. The projection at the upper end of Figure 10 in a plane normal to the bisecting axis shows movement of the point $X_1Y_1$ until it moves to $X_2Y_2Z_2$ through the angle $\phi$. Now it is evident from the projection in the upper part of Figure 10 that the perpendicular distance from the point $X_2Y_2Z_2$ to the bisecting axis is $R \cos \phi$, and that the $X_2Y_2Z_2$ point is a distance $R \sin \phi$ from the XY plane where R is the distance between the contact point and the bisecting axis. Likewise, it will be seen that the distance between the $X_1Y_1$ point and $X_2Y_2Z_2$ point in the XY plane is $R$ vers $\phi$. The distance between $X_1Y_1$ and $Y_1$ and $\theta/2$ as may be determined from the triangle. The Y distance between $X_1Y_1$ and $X_2Y_2Z_2$ is $R$ vers $\phi \sin \theta/2$. Therefore, the following equations may be stated for $X_2Y_2Z_2$:

$$Z_2 = R \sin \phi$$
$$X_2 = X_1 - R \text{ vers } \phi \cos \theta/2$$
$$Y_2 = Y_1 - R \text{ vers } \phi \sin \theta/2$$

The value of R may be determined in connection with Figure 6, it being understood that R is the radius of $X_1Y_1$ from the trunnion axis. By reference to Figure 6, it will be seen that R comprises two components, one component being $Y_1 \sin \theta_2$ as may be determined from the triangle WON wherein the value $Y_1$ is the hypotenuse. The other component is $X_1 \cos \theta/2$ as may be determined from the triangle defined by the points $(X_1Y_1)$ J, N.

Therefore—

$$R = Y_1 \sin \theta/2 + X_1 \cos \theta/2$$

In working out the values of the equations, the sign of the angles may be readily determined from inspection as the equations are worked out though it might be said for guidance as follows that apparently to determine the value of X, the value of $\theta$ above and below the X axis should be positive, the value of $\theta/2$ should be negative to the right of the Y axis, and the value of $\theta/2$ should be positive to the left of the Y axis. For Y, $\theta$ should be treated as positive below the X axis and negative above the X axis. In determining the $X_1Y_1$ values $\tau$ should always be treated as positive for determining $X_1$ values, but for determining $Y_1$ values, the value of $\tau$ should be positive above (in the Y direction) that point where $\tau$ equals zero and should be negative below the point where $\tau$ equals zero.

In determining the values of $X_2Y_2Z_2$, the values of $\phi$ above and below the XY plane should be treated as positive for determining $X_2Y_2$ values, whereas for determining $Z_2$ values, the value of $\phi$ should be treated as positive at one side of the XY plane and as negative at the other side.

From the foregoing, it should be understood now that given any shaft angle $\alpha$, the annular lines of contact on the cam surfaces can be determined. It should be understood also that by varying the value of $\alpha$ through a practical range of universal joint operation, the lines of contact on the cam surface progressively from the center may be determined by increasing the value of $\alpha$ by small increments. While attention perhaps has been directed more to cam surface 44, it is to be understood that the cam surface 45 has the same contour as surface 44. In other words, if the shafts are rotated about their axes through 180° from the positions shown in Figure 3, the cam surfaces would be reversed in position with the one coinciding with the position formerly occupied by the other. Therefore, each surface can be determined in the manner described.

Figures 12, 13:
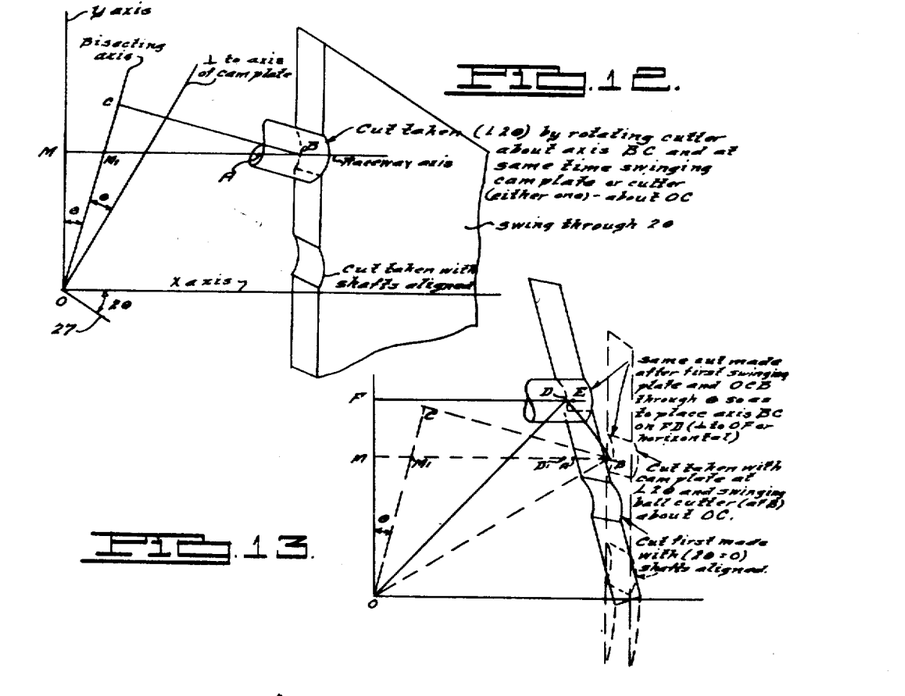

From a practical point of view, cam surfaces for effecting the ball movements may be obtained in the manner shown by Figures 11, 12, and 13. Assuming the shaft axes 10 and 27 aligned, a line of contact may be formed by a cutting tool having a rounded cutting surface of the same radii and center as the contact ball 47 of the joint with the tool axis coinciding with MA or the raceway axis. It is manifest now if we rotate the cutter about its own axis and swing it about the Y axis, the cutter will cut a path parallel to the X axis.

If now, as seen in Figure 12, we swing the cam plate shaft 27 through an angle $2\theta$ so that the bisecting axis moves through an angle $\theta$ (the angles $2\theta$ and $\theta$ here being used for convenience in place of $\theta$ and $\theta/2$), the bisecting axis will move through the angle $\theta$ and since the raceway axis remains the same, the cutter center will shift from the point A to the point B. Now, a second line of contact may be obtained by swinging the cutter about the bisecting axis OC. However, it is inconvenient to swing the cutter axis about an axis inclined to the vertical and this may be avoided, as seen in Figure 13, by making the same cut as shown in Figure 12 while still swinging the cutter about the Y axis. This result may be accomplished by swinging the entire assembly of Figure 12 through an angle $\theta$ counterclockwise. In other words, if we first swing the cam plate shaft through $2\theta$ and consequently the bisecting axis through $\theta$, we obtain a certain relationship, but this relationship may be maintained even though we now swing the entire assembly counterclockwise through $\theta$ so as to bring the bisecting axis into coincidence with the Y axis. Figure 13 shows this relationship with the cutter now on an axis FD perpendicular to the Y axis. Hence, for any angle $2\theta$, we swing the cam plate shaft through, we can cut a contact line in the cam plate while maintaining the axis of swinging of the cutter in a horizontal plane parallel to the X axis providing we swing the cam plate axis through $\theta$ but shift the cutter axis and change the radius of swinging the necessary amounts.

Figure 14:
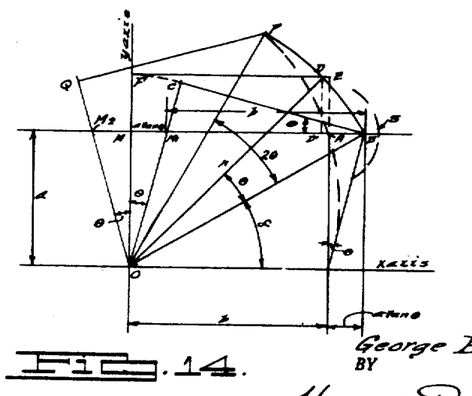

Referring to Figure 14, the points M and A correspond to the trunnion ball center and contact ball centers, respectively, but instead of a contact ball at A, a cutter is employed having the same radii as the contact ball with the axis of the cutter being MA. Now, if we swing through the angle $2\theta$ so that the bisecting axis moves from O to C and so that a point P on the cam plate swings to the point B, we can take a new cut if we rotate the cutter about the axis OC with the radii of swinging of the cutter equal to BC. Instead of doing this, however, if we swing the triangle OBC reversely through the angle $\theta$ so as to bring the axis OC into coincidence with OF, the point B moves to the point D. Hence, instead of effecting a cut with the center of the cutter at B, the same cut can be effected with the center at D with the axis of swinging being OF and the radii of swinging DF. Two changes have now occurred as compared to cutting with $\theta$=zero and these are. first, the radius of cutting has decreased from MA to FD, or, in other words, a decrease of $D_1A$ as seen in the drawing; secondly, the position of the axis of swinging has shifted above the raceway a distance equal to AE. We then need only to determine $D_1A$ and $AE$ to locate the new center of the cutter for any given angle $\theta$ through which the cam plate is moved, with the understanding that the angle $\theta$ is half the angle between the shaft axes.

From the drawing, it will be apparent that $$FD = BC = b \cos \theta$$
$$EF = b$$
$$DE = EF - FD = b - b \cos \theta = b(1-\cos \theta) = b \text{ vers } \theta$$

The value of $D_1D$ may be determined as follows:

$$\sin \alpha = a/r$$

$$\cos \alpha = \frac{b + a \tan \theta}{r}$$

$$D_1D = EA = r \sin(\alpha + \theta) - a$$

and this can be shown to be $DD_1 = b \sin \theta + a$ ex-sec $\theta$.

From this it will be aparent that all that is necessary is to swing the cam plate through $\theta$ ($\theta$ being equal to half the shaft angle) and then locate the center of the cutter surface by the equations evaluating $DE$ and $DD_1$ and then swing the cutter about the Y axis. In other words, the new center is located by moving it a distance $DE$ to the left and a distance $D_1D$ upwardly as seen in Figure 14. Both cam surfaces may be formed in the same way, since both will be identical.

Although only one form of the invention has been illustrated and described, it will be apparent to those skilled in the art that various changes and modifications may be made without departing from the spirit of the invention, the scope of which is commensurate with the appended claims.

What is claimed is:

1. A universal joint comprising a first shaft element having a body provided with diametrically opposite straight guideways extending parallel to the shaft axis, a second shaft element, an intermediate member including a pair of aligned, oppositely disposed trunnions projecting outwardly into the guideways, respectively, bearing means turnable on the trunnions and movable along the guideways, means pivotally connecting the second shaft element to the intermediate member for swinging movement about an axis crosswise of the mentioned trunnions, and means for automatically shifting the trunnions into a position where their axis substantially bisects the angle between the shafts when one shaft is tilted relative to the other, said means including elements reciprocable in the guideways and engaging the bearings means and means on the second shaft element for moving the reciprocable elements.

2. A universal joint comprising a first shaft element having a body provided with diametrically opposite straight guideways extending parallel to the shaft axis, a second shaft element, an intermediate member including a pair of aligned, oppositely disposed trunnions projecting outwardly into the guideways, respectively, bearing means turnable on the trunnions and movable along the guideways, means pivotally connecting the second shaft element to the intermediate member for swinging movement about an axis crosswise of the mentioned trunnions, and means for automatically shifting the trunnions into a position where their axis substantially bisects the angle between the shafts when one shaft is tilted relative to the other, said means including reciprocable elements in the guideways and engaging the bearing means and cam surfaces on the second shaft element for moving the reciprocable elements.

3. A universal joint comprising a first shaft element having a body provided with diametrically opposed cylindrical guideways with their axes parallel to and spaced from the shaft axis, a second shaft element, an intermediate member connected to the second shaft element and having aligned trunnions projecting outwardly into the guideways respectively, an apertured ball element turnable on each trunnion and having bearing engagement with the sides of the guideway therefor, and means for shifting the trunnions into positions where their axis substantially bisects the angle between the shafts and including second ball elements for moving the first ball element along their guideways and also including means on the second shaft engaging the second ball elements in order to move the latter.

4. A universal joint comprising a first shaft element having a body provided with diametrically opposed cylindrical guideways with their axes parallel to and spaced from the shaft axis, a second shaft element, an intermediate member connected to the second shaft element and having aligned trunnions projecting outwardly into the guideways respectively, an apertured ball element turnable on each trunnion and having bearing engagement with the sides of the guideway therefor, and means for shifting the trunnions into positions where their axis substantially bisects the angle between the shafts, said means including plungers slidable in the guideways and contacting the ball elements and cam surfaces on the second shaft element for moving the plungers.

5. A universal joint comprising a first shaft element having a body provided with diametrically opposed cylindrical guideways with their axes parallel to and spaced from the shaft axis, a second shaft element, an intermediate member connected to the second shaft element and having aligned trunnions projecting outwardly into the guideways respectively, an apertured ball element turnable on each trunnion and having bearing engagement with the sides of the guideway therefor, and means for shifting the trunnions into positions where their axis substantially bisects the angle between the shafts, said means including plungers slidable in the guideways and contacting the ball elements.

6. A universal joint comprising a first shaft element having a body provided with diametrically opposed cylindrical guideways with their axes parallel to and spaced from the shaft axis, a second shaft element, an intermediate member having aligned trunnions projecting outwardly into the guideways respectively, an apertured ball element turnable on each trunnion and having bearing engagement with the sides of the guideway therefor, and means for shifting trunnions into positions where their axis substantially bisects the angle between the shafts, said means including plungers slidable in the guideways and at one end contacting the ball elements, second ball elements engaging the opposite end of the plungers, and also including means on the second shaft element engaging the second ball elements in order to move the latter.

7. A universal joint comprising a first shaft element having a body provided with diametrically opposed cylindrical guideways with their axes parallel to and spaced from the shaft axis, a second shaft element, an intermediate member connected to the second shaft element and having aligned trunnions projecting outwardly into the guideways respectively, an apertured ball element turnable on each trunnion and having bearing engagement with the sides of the guideway therefor, and means for shifting the trunnions into positions where their axis substantially bisects the angle between the shafts, said means including plungers slidable in the guideways and at one end contacting the ball elements, second ball elements engaging the opposite end of the plungers, and also including cam means on the second shaft element engaging the second ball elements in order to move the latter.

8. A universal joint comprising a first shaft element having a body provided with diametrically opposed cylindrical guideways with their axes parallel to and spaced from the shaft axis, a second shaft element, an intermediate member connected to the second shaft element and having aligned trunnions projecting outwardly into the guideways respectively, an apertured ball element turnable on each trunnion and having bearing engagement with the sides of the guideway therefor, and means for shifting the trunnions into positions where their axis substantially bisects the angle between the shafts, said means comprising plungers slidable in the guideways and at one end contacting the ball elements, curved surface elements for moving the plungers and saucer-shape cam surfaces on the second shaft element having substantially point contact with said curved surfaces.

9. A universal joint comprising a pair of shaft elements adapted to be connected to a pair of shafts respectively, an intermediate member drivingly connecting the members, means centering the shaft elements and member so that tilting or angling of the shaft elements occurs about a joint center, said intermediate member providing a trunnion axis extending diametrically through the joint center, and means including a saucer-shape cam surface on one shaft member and ball elements in contact with said surface for automatically shifting the intermediate member and trunnion axis so that the latter substantially bisects the angle between the shafts when one shaft element is angled relative to the other.

10. A universal joint comprising a pair of shaft elements adapted to be connected to a pair of shafts respectively, an intermediate member drivingly connecting the members, means centering the parts so that tilting or angling thereof occurs about a joint center, said intermediate member providing a trunnion axis extending diametrically through the joint center, means providing a spline or slip joint connection between one shaft member and the other without disturbing the joint center, and means for automatically swinging the intermediate member and trunnion axis so that the latter substantially bisects the angle between the shafts when one shaft element is angled relative to the other, said last means including cam surfaces on one shaft element and elements contacting said surfaces and operatively engaging the intermediate member for swinging the latter.

11. A universal joint comprising a pair of shaft elements, one of said members having a body provided with diametrically opposed guideways spaced oppositely from the shaft axis, a second shaft member, an intermediate member having a pair of diametrically aligned trunnions extending outwardly into the guideways respectively, apertured bearing elements turnable on the trunnions and having bearing engagement with the sides of the guideways, means pivotally connecting the second shaft element to the intermediate member for swinging movement about a transverse axis crossing the first trunnion axis, means centering the shaft elements and intermediate member so that the axes of both shaft elements and the crossing axis of the intermediate member intersect substantially a single joint center while permitting slip joint shifting of the first shaft element along its axis relative to the intermediate member, and means operatively interconnecting the intermediate member and the second shaft element for automatically effecting swinging of the intermediate member about said transverse axis so as to move the trunnion axis into a plane bisecting the angle between the shafts when one shaft element is angled relative to the other, said guideways being cylindrical in character with their axes parallel to but spaced from the shaft axis.

12. A universal joint comprising a pair of shaft elements, one of said members having a body provided with diametrically opposed guideways spaced oppositely from the shaft axis, a second shaft member, an intermediate member having a pair of diametrically aligned trunnions extending outwardly into the guideways respectively, apertured bearing elements turnable on the trunnions and having bearing engagement with the sides of the guideways, means pivotally connecting the second shaft element to the intermediate member for swinging movement about a transverse axis crossing the first trunnion axis, means centering the shaft elements and intermediate member so that the axes of both shaft elements and the crossing axis of the intermediate member intersect substantially a single joint center while permitting slip joint shifting of the first shaft element along its axis relative to the intermediate member, and means operatively interconnecting the intermediate member and the second shaft element for automatically effecting swinging of the intermediate member about said transverse axis so as to move the trunnion axis into a plane bisecting the angle between the shafts when one shaft element is angled relative to the other, the last named means comprising plunger means in the guideways and contacting the bearing elements and cam surfaces on the second shaft element operatively engaging the plunger means.

13. A universal joint comprising a pair of shaft elements, one of said members having a body provided with diametrically opposed guideways spaced oppositely from the shaft axis, a second shaft member, an intermediate member having a pair of diametrically aligned trunnions extending outwardly into the guideways respectively, apertured bearing elements turnable on the trunnions and having bearing engagement with the sides of the guideways, means pivotally connecting the second shaft element to the intermediate member for swinging movement about a transverse axis crossing the first trunnion axis, means centering the shaft elements and intermediate member so that the axes of both shaft elements and the crossing axis of the intermediate member intersect substantially a single joint center while permitting slip joint shifting of the first shaft element along its axis relative to the intermediate member, and means operatively interconnecting the intermediate member and the second shaft element for automatically effecting swinging of the intermediate member about said transverse axis so as to move the trunnion axis into a plane bisecting the angle between the shafts when one shaft element is angled relative to the other, the last named means comprising plunger means in the guideways and contacting the bearing elements and cam surfaces on the second shaft element operatively engaging the plunger means, said guideways being cylindrical in character with their axes parallel to but spaced from the shaft axis and the bearing elements comprising ball elements engaging opposite sides of such guideways.

GEORGE E. DUNN.

REFERENCES CITED

The following references are of record in the file of this patent:

UNITED STATES PATENTS

| Number | Name | Date |
| --- | --- | --- |
| 2,341,084 | Dodge | Feb. 8, 1944 |
| 2,352,776 | Dodge | July 4, 1944 |
| 1,921,274 | Warner | Aug. 8, 1933 |
| 1,983,533 | Brown | Dec. 11, 1934 |

OTHER REFERENCES

Le Genie Civil, Apr. 15, 1933.

Certificate of Correction

Patent No. 2,432,395. December 9, 1947.

GEORGE E. DUNN

It is hereby certified that errors appear in the printed specification of the above numbered patent requiring correction as follows: Column 2, line 38, for the word "cup" read *cups*; line 52, for "contant" read *constant*; column 4, line 69, for that portion of the equation reading "$a/2 \, scc^2 \, \theta/2$" read $a/2 \, sec^2 \, \theta/2$; column 7, line 19, strike out "$Y_1$ and $\theta/2$ as may be determined from the triangle" and insert instead $X_2 Y_2 Z_2$ *parallel to the X axis is R vers $\phi$ cos $\theta/2$*.; and that the said Letters Patent should be read with these corrections therein that the same may conform to the record of the case in the Patent Office.

Signed and sealed this 17th day of February, A. D. 1948.

[SEAL]

THOMAS F. MURPHY,
*Assistant Commissioner of Patents.* one shaft element is angled relative to the other, the last named means comprising plunger means in the guideways and contacting the bearing elements and cam surfaces on the second shaft element operatively engaging the plunger means, said guideways being cylindrical in character with their axes parallel to but spaced from the shaft axis and the bearing elements comprising ball elements engaging opposite sides of such guideways.

GEORGE E. DUNN.

REFERENCES CITED

The following references are of record in the file of this patent:

UNITED STATES PATENTS

| Number | Name | Date |
| --- | --- | --- |
| 2,341,084 | Dodge | Feb. 8, 1944 |
| 2,352,776 | Dodge | July 4, 1944 |
| 1,921,274 | Warner | Aug. 8, 1933 |
| 1,983,533 | Brown | Dec. 11, 1934 |

OTHER REFERENCES

Le Genie Civil, Apr. 15, 1933.

Certificate of Correction

Patent No. 2,432,395. December 9, 1947.

GEORGE E. DUNN

It is hereby certified that errors appear in the printed specification of the above numbered patent requiring correction as follows: Column 2, line 38, for the word "cup" read *cups*; line 52, for "contant" read *constant*; column 4, line 69, for that portion of the equation reading "$a/2\ scc^2\ \theta/2$" read $a/2\ sec^2\ \theta/2$; column 7, line 19, strike out "$Y_1$ and $\theta/2$ as may be determined from the triangle" and insert instead $X_2 Y_2 Z_2$ *parallel to the X axis is R vers $\phi$ cos $\theta/2$.*; and that the said Letters Patent should be read with these corrections therein that the same may conform to the record of the case in the Patent Office.

Signed and sealed this 17th day of February, A. D. 1948.

[SEAL]

THOMAS F. MURPHY,
*Assistant Commissioner of Patents.*